United States Patent
Wang (10) Patent No.: US 10,503,287 B2
(45) Date of Patent: Dec. 10, 2019

(54) ADJUSTABLE HANDHELD STYLUS

(71) Applicant: Apple Inc., Cupertino, CA (US)

(72) Inventor: Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/689,800

(22) Filed: Aug. 29, 2017

(65) Prior Publication Data
US 2019/0064936 A1    Feb. 28, 2019

(51) Int. Cl.
*G06F 3/038* (2013.01)
*G06F 3/0354* (2013.01)
*G06F 3/01* (2006.01)

(52) U.S. Cl.
CPC .............. *G06F 3/038* (2013.01); *G06F 3/016* (2013.01); *G06F 3/03545* (2013.01); *G06F 2203/0384* (2013.01)

(58) Field of Classification Search
CPC ...... G06F 3/038; G06F 3/016; G06F 3/03545; G06F 2203/0384
See application file for complete search history.

(56) References Cited

U.S. PATENT DOCUMENTS

| | | | |
|---|---|---|---|
| 4,035,089 A * | 7/1977 | Schwartz | B23B 31/40 15/443 |
| 7,535,456 B2 | 5/2009 | Liberty et al. | |
| 2010/0084202 A1* | 4/2010 | Selin | G06F 3/03545 178/19.01 |
| 2012/0212442 A1* | 8/2012 | Uchida | G06F 3/016 345/173 |
| 2014/0160063 A1 | 6/2014 | Yairi et al. | |
| 2014/0315642 A1* | 10/2014 | Grant | A63F 13/06 463/38 |
| 2014/0320400 A1* | 10/2014 | Jiang | G06F 3/016 345/156 |
| 2015/0261382 A1* | 9/2015 | Lin | G06F 3/03545 345/175 |
| 2017/0090604 A1* | 3/2017 | Barbier | G06F 3/03545 |

* cited by examiner

*Primary Examiner* — Sahlu Okebato
(74) *Attorney, Agent, or Firm* — Morgan, Lewis & Bockius LLP

(57) ABSTRACT

An input device, such as a stylus, can include an adjustment element that changes a size and/or shape of the stylus. The size and/or shape of a grip region or end portion of the stylus can be altered to mimic characteristics of a writing or drawing tool or to better accommodate the size of a user's hand. The size and/or shape of the stylus can also be altered to limit rolling of the stylus on a surface or to accommodate coupling to another device, such as a charger. Haptic feedback can also be provided to a user by operation of the adjustment element.

20 Claims, 7 Drawing Sheets

ADJUSTABLE HANDHELD STYLUS

TECHNICAL FIELD

The present description relates generally to handheld devices, such as styluses, and, more particularly, to handheld devices having adjustable size and/or shape features.

BACKGROUND

A variety of handheld input devices exist for detecting input from a user during use. For example, an electronic stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move the stylus in a pattern that the electronic device translates into an input command. The user can grip the stylus while in use. Styluses are available in a variety of shapes and sizes that are each intended to satisfy certain user preferences. However, while some shapes and sizes are advantageous for certain purposes, the same shapes and sizes can be less desirable for other purposes.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A handheld input device in accordance with embodiments disclosed herein can include any device that is held, worn, or contacted by a user for receiving inputs from the user. In an exemplary embodiment, an electronic stylus is used to provide inputs to an external device. The user manipulates the orientation and position of the stylus relative to an interface surface of the external device to convey information to the external device such as, but not limited to, writing, sketching, scrolling, gaming, selecting user interface elements, moving user interface elements, and so on.

The size and/or shape of the stylus can be altered during use thereof to accommodate a user. For example, the size and/or shape of a grip region of the stylus can be altered to mimic characteristics of a writing or drawing tool (e.g., pen, pencil, chalk, marker, or paintbrush). By further example, the size and/or shape of the grip region of the stylus can be altered to better accommodate the size of a user's hand. By further example, the size and/or shape of an end portion of the stylus can be altered to provide features for contacting the stylus to a surface, such as an electronic display, in a particular way.

The size and/or shape of the stylus can also be altered to facilitate functions while not gripped by a user. For example, the size and/or shape of the stylus can be altered to limit rolling of the stylus on a surface. By further example, the size and/or shape of the stylus can be altered to accommodate coupling to another device, such as a charger.

The size and/or shape of the stylus can be altered to provide haptic feedback to a user. For example, the size and/or shape of the stylus can be altered repeatedly as a notification to a user gripping the stylus. The haptic feedback can be provided at a grip region of the stylus and/or elsewhere on the stylus.

These and other embodiments are discussed below with reference to FIGS. 1-19. However, those skilled in the art will readily appreciate that the detailed description given herein with respect to these figures is for explanatory purposes only and should not be construed as limiting.

Figure 1:
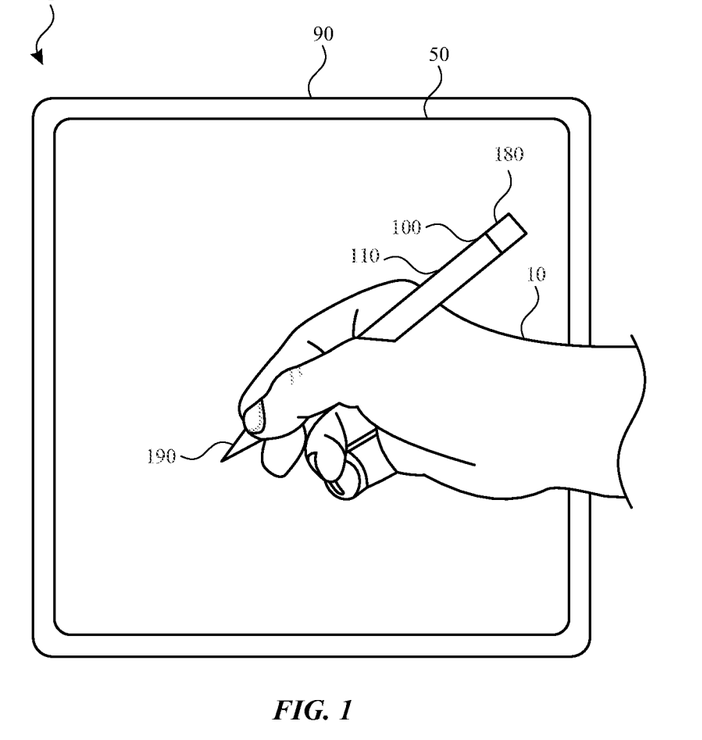
FIG. 1 illustrates a view of an exemplary system with a stylus in use by a user.

A handheld input device in accordance with embodiments disclosed herein can include any device that is held, worn, or contacted by a user for receiving inputs from the user. The handheld input device, such as an electronic stylus, can be used alone or in conjunction with another device. For example, FIG. 1 illustrates a system 1 including a stylus 100 and an external device 90, having an interface surface 50. The stylus 100 can be held by a user 10 and operate as a handheld input device for use with the external device 90.

The user manipulates the orientation and position of the stylus 100 relative to the interface surface 50 of the external device 90 to convey information to the external device 90 such as, but not limited to, writing, sketching, scrolling, gaming, selecting user interface elements, moving user interface elements, and so on. The interface surface 50 can include a display surface and/or a touch panel for interacting with the stylus 100 when contacted thereby. For example, the stylus 100 can include a tip probe 190 for contacting the interface surface 50. Such contact can be detected by the external device 90 and/or the stylus 100. For example, the stylus 100 can include one or more sensors that detect when the tip probe 190 contacts the interface surface 50. In many embodiments, the interface surface 50 of the external device 90 is a multi-touch display screen, but this is not required; in other embodiments, the input surface can be a non-display input surface such as a trackpad or drawing tablet.

A tip probe 190 of the stylus 100 can be used to contact a surface of an object. Such contact can be detected with one or more contact sensors, capacitive sensors, touch sensors, cameras, piezoelectric sensors, pressure sensors, photodiodes, and/or other sensors operable to detect contact with the object.

Figure 2:
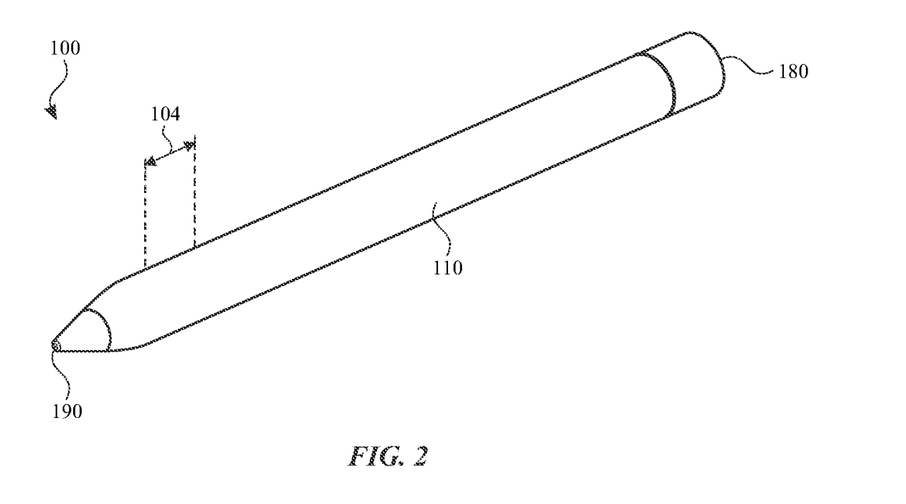
FIG. 2 illustrates a perspective view of the stylus of FIG. 1.
Figure 3:
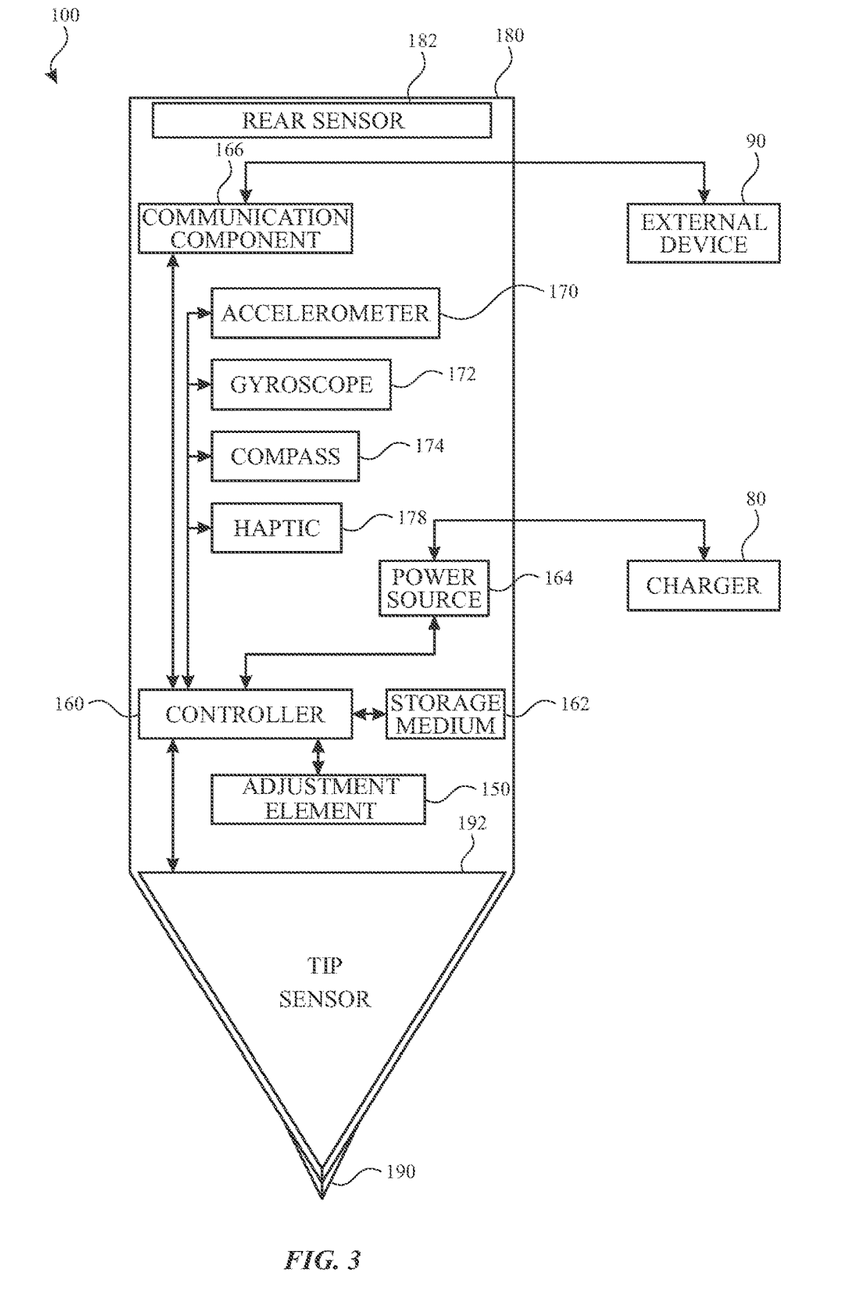
FIG. 3 illustrates a block diagram illustrating the stylus of FIG. 1.

Initially, reference is made to certain physical and operational characteristics of the stylus 100, for example as shown in FIG. 2-3. The stylus 100 may take various forms to facilitate use and manipulation by the user 10. As shown in FIG. 2, the stylus 100 has the general form of a writing instrument such as a pen or a pencil. In the illustrated embodiment, the stylus 100 includes a body 110 with two end portions that define longitudinal ends of the stylus 100. The body 110 can define an outer periphery of the stylus 100. The body 110 can define at least half of a total length of the stylus 100. In this example, the two ends of the body 110 are terminated respectively with the tip probe 190 and a rear portion 180. Either or both of the tip probe 190 and a rear portion 180 can be removable, affixed to the body, or an integral part of the body.

As illustrated in FIG. 2, the body 110 can form an outer surface (or partial outer surface) and protective case for one or more internal components of the stylus 100. Although illustrated in FIG. 2 as a cylinder, the body 110 need not take a cylindrical shape in all embodiments. Accordingly, as used herein, the term "diameter" refers to the linear distance that can connect two points of a two-dimensional shape through a centroid of the two-dimensional shape, whether the shape is circular or otherwise. The body 110, or portions thereof, can exhibit a constant or adjustable size and/or shape, as discussed further herein.

The stylus 100 can support handling and operation by a user. In particular, the stylus 100 can have an adjustable size and/or shape for accommodating a user's grip. A user can grip the stylus 100 at a grip region 104 during use of the stylus 100. The grip region 104 can be located at a natural grip location. The grip region 104 can be near the tip probe 190 of the stylus 100. For example, the location of the grip region 104 can be a distance from the tip probe 190 that is less than a half, a third, or a quarter of the total length of the stylus 100. The grip region 104 can be a portion of the body 110. The grip region 104 can include one or more grip features (not shown) such as embossments or impressions, closely-spaced channels, protrusions, projections and/or the like. In some cases, a grip feature can be formed from a different material than the body 110. The grip feature(s) may be formed from a polymer material exhibiting high friction.

In some cases, the body 110 can define one or more apertures in which one or more input/output components such as a button, a dial, a slide, a force pad, a touch pad, audio component, haptic component, and the like may at least partially reside. The apertures (and, correspondingly, the input/output components associated therewith) can be defined at a grip region 104 near the tip probe 190. In this manner, the input/output components may be conveniently located near where the user 10 may rest the user's forefinger on the body 110 when grasping the stylus 100.

The stylus 100 can be provided with components that facilitate the operation thereof FIG. 3 illustrates various components of the stylus 100, according to some embodiments of the subject technology.

The stylus 100 can include a tip sensor 192 at the tip probe 190 of the stylus 100 for sensing when the tip probe 190 is contacting a surface, such as the interface surface 50. The stylus 100 can include a rear sensor 182 at the rear portion 180 of the stylus 100 for sensing when the rear portion 180 is contacting a surface, such as the interface surface 50. The tip sensor 192 and/or the rear portion 180 can include one or more contact sensors, capacitive sensors, touch sensors, cameras, piezoelectric sensors, pressure sensors, photodiodes, and/or other sensors.

The stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof The controller 160 can execute one or more instructions stored in the non-transitory storage medium 162 to perform one or more functions.

The stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

The stylus 100 can include a power source 164, such as one or more batteries and/or power management units. The stylus 100 can include components for charging the power source 164, such as a component that is exposed when the rear portion 180 is removed. Alternatively or additionally, the stylus 100 can include wireless charging capabilities for charging the power source 164. The power source 164 can receive electrical power from a charger 80. The charger 80 can be a component of the external device 90 or a separate device.

The stylus 100 can include an accelerometer 170, a gyroscope 172, and/or a compass 174. The stylus 100 can include a haptic device 178 for providing haptic feedback to a user. The stylus 100 can include other components including, for example, orientation detectors, biometric readers, displays, sensors, switches (e.g., dome switches), buttons, speakers, microphones, cameras, voice coils, and/or other components.

The stylus 100 can include an adjustment element 150 to adjust a size and/or shape of the stylus 100. The adjustment element 150 can be or include one or more devices configured to apply a stimulus to a portion of the stylus 100, such as the body 110, the tip probe 190, and the rear portion 180. The applied stimulus can elicit a response that includes adjustment of a size and/or shape of the stylus 100. Various exemplary embodiments of the adjustment element 150 and applied stimuli are described in detail herein. The adjustment element 150 can be operated by the controller 160 automatically, based on user input, and/or based on communications with the external device 90. For example, the controller 160 can detect conditions (e.g., whether or not a user is holding the stylus 100) and automatically operate the adjustment element 150 based on programmed actions corresponding to detected conditions.

A body of a stylus can be adjusted to change a size of at least a portion of the stylus. As used herein, a "size" of a structure can be indicated by a diameter, a circumference, a surface area, an enclosed cross-sectional area, and/or an enclosed volume of the structure. A size of a structure can change in one aspect while remaining the same or changing in another aspect. For example, a shape can change such that a diameter increases in one dimension while decreasing in another dimension. As used herein, a "shape" of a structure can be indicated by a cross-sectional profile having a particular curvature or curvatures in one or more sections of the cross-sectional profile. A cross-sectional shape can extend uniformly across a longitudinal length of an object, such that the object has the same shape at every portion of the longitudinal length. Alternatively, a cross-sectional shape can be variable.

Figure 4:
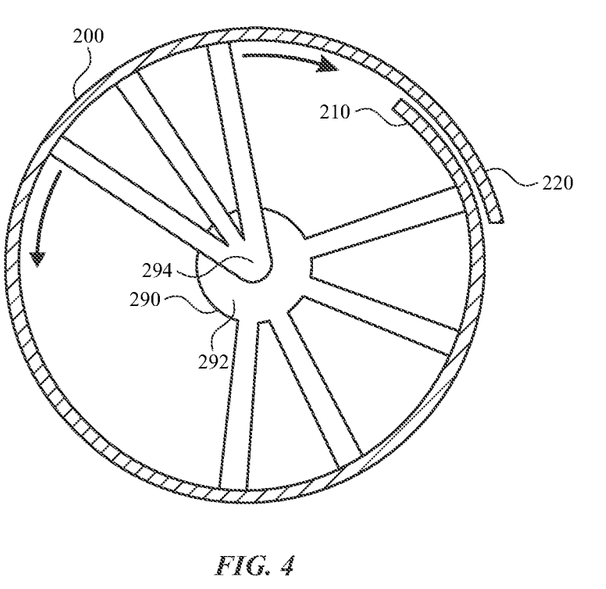
FIG. 4 illustrates a cross-sectional view of an exemplary body of a stylus.

A body of a stylus can have an adjustable size (e.g., diameter) by providing components that move relative to each other. As shown in FIG. 4, a body 200 can define an outer periphery of a stylus. The body 200 can include a first portion 210 and a second portion 220, each including a circumferential end (e.g., edge) of the body 200. For example, the body 200 can extend circumferentially about a space with the first portion 210 and the second portion 220 overlapping on at least a side of the body 200. Edges defined by the first and second portions 210, 220 extend longitudinally along at least a portion of a length of the body 200.

A size of the body 200 can be adjusted by changing an amount of overlap between the first and second portions 210, 220. For example, when the amount of overlap between the first and second portions 210, 220 is increased, the size of the body 200 decreases. Inversely, when the amount of overlap between the first and second portions 210, 220 is decreased, the size of the body 200 increases. The body 200 can be deformable to facilitate the change in overlap and adjustment to size.

The amount of overlap between the first and second portions 210, 220 can be adjusted by applying, with an adjustment element, a stimulus including a torque to one or both of the first and second portions 210, 220. The adjustment element can be or include a motor 290 having a stator 292 and a rotor 294. As shown in FIG. 4, the motor 290 can be housed within the body 200 and connected to the body 200 to act thereon. For example, the stator 292 can be connected to the first portion 210, and the rotor 294 can be connected to the second portion 220. Operation of the motor 290 can allow the rotor 294 to rotate with respect to the stator 292 and thereby adjust the relative positions of the first and second portions 210, 220. Rotation can be performed in either direction to increase or decrease the size of the body 200. The motor 290 can be a stepper motor that controls incremental rotation. Upon achieving a target size of the body 200, the motor 290 can persistently maintain the size for a duration of time, for example, by actively controlling the motor 290 or by applying a locking mechanism, such as a detent or latch, to secure the body 200.

Figure 5:
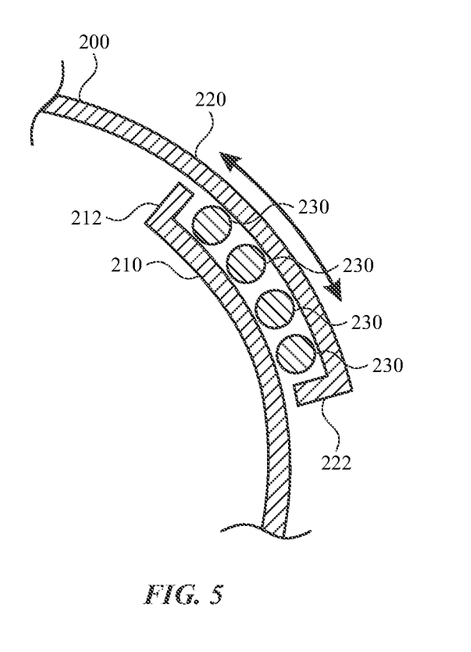
FIG. 5 illustrates another cross-sectional view of the body of FIG. 4.

As shown in FIG. 5, a region of overlap between the first and second portions 210, 220 can include one or more bearing elements 230 to facilitate the relative motion of the first and second portions 210, 220. The bearing elements 230 can be positioned radially between the first and second portions 210, 220. The bearing elements 230 can include, for example, ball bearings, cylinders, other rolling elements, and/or low-friction sliding elements. The first portion 210 can include a first shoulder 212 and the second portion 220 can include a second shoulder 222 to at least partially enclose the region of overlap and retain the bearing elements 230. The first and second shoulders 212, 222 can limit movement of the first and second portions 210, 220 by engaging each other or the bearing elements 230 when the body 200 is expanded to a certain extent.

While the body 200 is shown in FIGS. 4 and 5 as being generally cylindrical, other shapes are contemplated. For example, the body 200 can have a cross-sectional shape that is circular, oval, polygonal, or a combination thereof By further example, the first and second portions 210, 220 can define shapes that are not curved or that have different curvatures. Where the first and second portions 210, 220 are flat or planar, the first and second portions 210, 220 can move across each other to change an amount of overlap and adjust the size of the body 200.

While the body 200 is shown in FIGS. 4 and 5 as having an adjustable diameter, other adjustments are contemplated. For example, the body 200 can have an adjustable longitudinal length. By further example, separate portions of the body 200 can have an adjustable amount of overlap that varies in longitudinal length as the portions move relative to each other For example, the body 200 can have a telescoping feature.

The body 200 can have an adjustable size (e.g., diameter) at a grip region of a stylus. For example, the body 200 can be included in the stylus 100 to provide an adjustable size at the grip region 104. The size can be selected manually by a user or automatically based on programmed parameters. The size of the grip region 104 of the stylus 100 can be altered to mimic characteristics of a particular writing or drawing tool (e.g., pen, pencil, chalk, marker, or paintbrush). The size of the grip region 104 of the stylus 100 can be altered to accommodate the size of a user's hand. For example, a size can be applied for use by an adult and a different size can be applied for use by a child. Alternatively or additionally, the body 200 can have an adjustable size at region other than the grip region of the stylus.

Additional structures can be provided to the body 200 for user comfort. The body 200 can define a radially outermost extent of the stylus or lie within the stylus. For example, a cover (not shown) can be provided about the body 200. The cover can be expandable to adjust with the adjustments of the body 200. When the first and second portions 210, 220 move relative to each other, the cover maintains a circumferentially continuous radial outermost extent of the stylus. As such, the cover can prevent pinching, interference, and entry of debris as the first and second portions 210, 220 move relative to each other.

While the body 200 is shown in FIGS. 4 and 5 as being adjustable by action of a motor, the body 200 can be adjustable based on another adjustment element and/or stimulus. According to some embodiments, the size of the body 200 can be manually adjustable by providing a user with access to the body 200 or components connected thereto. For example, the user can twist the first and second portions 210, 220 relative to each other to adjust the size of the body 200. Upon achieving a target size of the body 200, the body 200 can persistently maintain the size for a duration of time, for example, by applying a locking mechanism, such as a detent or latch, to secure the body 200 until the user overcomes or releases the securement.

According to some embodiments, the size (e.g., diameter) of the body 200 can be adjusted by applying, with an adjustment element, a thermal stimulus to one or both of the first and second portions 210, 220. For example, the body 200 can include a shape-memory material (e.g., alloy) that is responsive to temperature conditions. The body 200 can have a first size in a martensite phase of the shape-memory material and a second size in an austenite phase of the shape-memory material. The adjustment element can be or include a heater to apply heat to the body 200 and/or a cooler to remove heat from the body 200.

According to some embodiments, the size of the body 200 can be adjusted by applying, with an adjustment element, an electrical stimulus to one or both of the first and second portions 210, 220. For example, the body 200 can include an electroactive or charge induced material (e.g., electroactive polymer) that is responsive to electric fields. The body 200 can have a first size in the presence of an electric field and a second size in the absence of the electric field or in the presence of a different electric field. The adjustment element can be or include a voltage source connected to the body 200.

According to some embodiments, the size of the body 200 can be adjusted by applying, with an adjustment element, a hydraulic force to one or both of the first and second portions 210, 220. For example, the adjustment element can be or include a hydraulic press connected to the first and second portions 210, 220. The hydraulic press can apply forces to one or both of the first and second portions 210, 220 to achieve relative movement until a target size of the body 200 is achieved.

Figure 6:
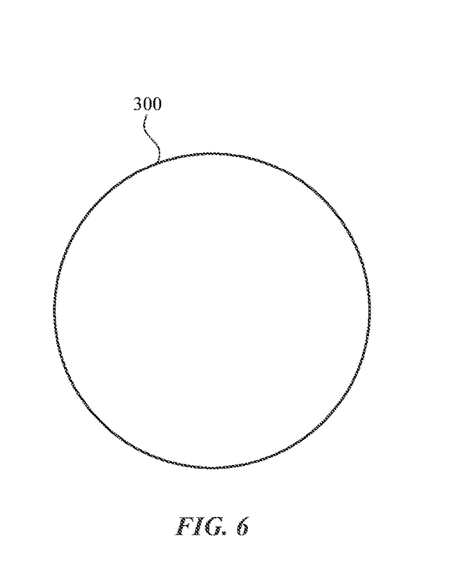
FIG. 6 illustrates a cross-sectional view of an exemplary body of a stylus.
Figure 7:
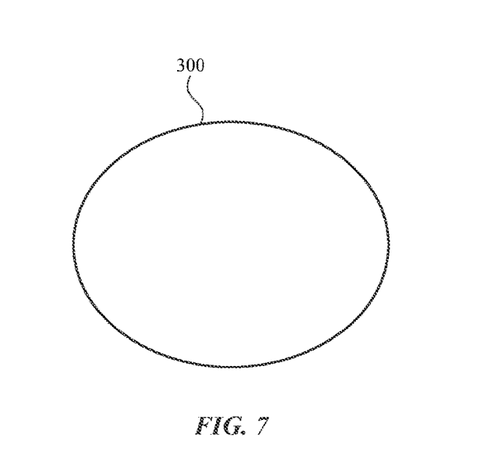
FIG. 7 illustrates a cross-sectional view of an exemplary body of a stylus.
Figure 8:
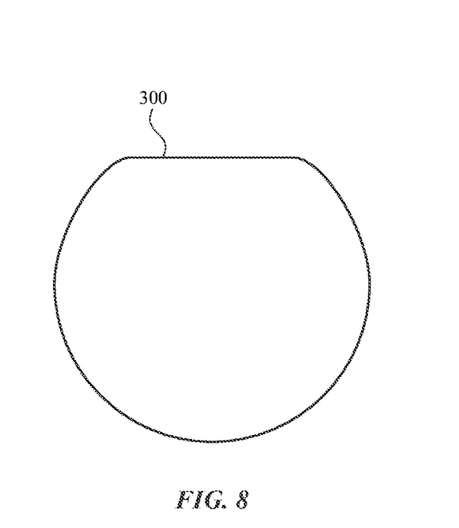
FIG. 8 illustrates a cross-sectional view of an exemplary body of a stylus.
Figure 9:
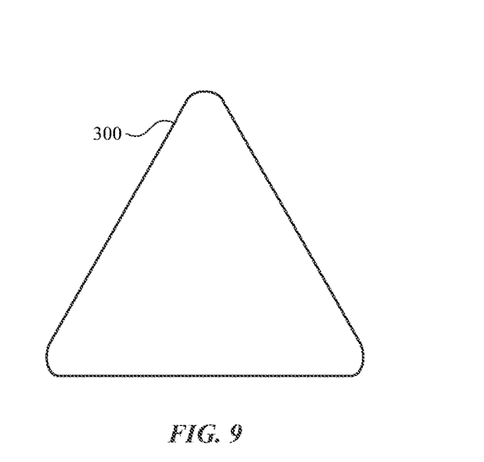
FIG. 9 illustrates a cross-sectional view of an exemplary body of a stylus.

A body of a stylus can have a cross-sectional shape (e.g., curvature) that is adjustable based on a stimulus from an adjustment element. As shown in FIGS. 6-9, various cross-sectional shapes can be achieved in a body 300 of a stylus. The body 300 can define an outer periphery of a stylus. Each cross-sectional shape can have features that may be desired based on usage of the stylus. As shown in FIG. 6, a circular cross-sectional shape of the body 300 provides a consistent curvature along every section thereof. As shown in FIG. 7, a cross-sectional shape of the body 300 having a curve and a line provides smooth curvature in one region as well as another region that limits continuous rolling and provides a flat surface for coupling to another device. As shown in FIG. 8, an oval cross-sectional shape of the body 300 provides smooth and variable curvature while limiting continuous rolling. As shown in FIG. 9, a polygonal cross-sectional shape of the body 300 can provide no curvature in at least a section thereof to limit continuous rolling and provide a flat surface for coupling to another device.

The body 300 can also have one or more other shapes in one or more regions thereof In some states, the body 300 can include a variable cross-sectional shape (e.g., a shape of the body 300 can change across the length of the body 300). In some states, the body 300 can have an n-sided polygonal cross-section (e.g., triangular cross-section, square cross-section, pentagonal cross-section, and so on). In some states, the shape of the body 300 follows a mathematical function such as a bump function, a Gaussian function, or a step function. In some states, the shape of the body 300 is radially and/or axially symmetric. In some states, the shape of the body 300 is an ergonomic shape, including grooves, indents, and/or protrusions configured to enhance the comfort of the user 10. In some states, the shape of the body 300 includes a tapered section that decreases in diameter, linearly or non-linearly, toward the tip probe 190. In some states, the shape of the body 300 includes a combination of the shapes described herein.

A stimulus can be provided to the body 300 to adjust its shape in one or more regions thereof Each of multiple cross-sectional shapes can be provided when the body 300 of a stylus transitions between different states. The body 300 can also be adjusted to simultaneously have different shapes at different regions thereof.

Figure 10:
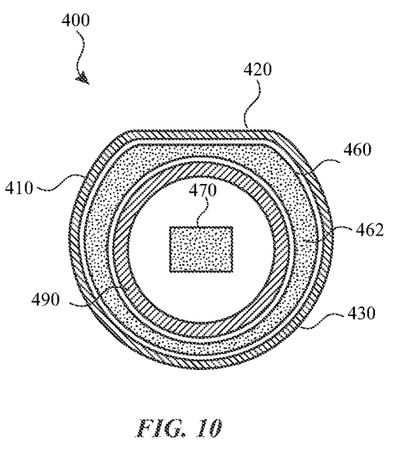
FIG. 10 illustrates a cross-sectional view of an exemplary stylus in a first state.
Figure 11:
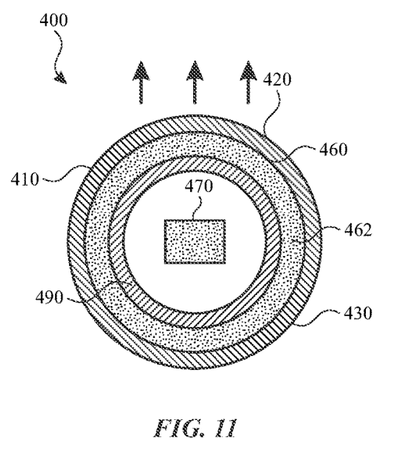
FIG. 11 illustrates a cross-sectional view of the exemplary stylus of FIG. 10 in a second state.

A shape of a body can be adjusted based on a stimulus provided to the body. As shown in FIGS. 10 and 11, a stylus 400 includes a body 410 that defines an outer periphery of the stylus 400. The body 410 can include an adjustable first portion 420 and a second portion 430. The first portion 420 and the second portion 430 can each extend longitudinally and partially along a perimeter of the body 410, as shown in the cross-sectional view of FIGS. 10 and 11. Within the body 410, the stylus 400 can include a support member 490. An expansion element 460, such as a bladder, can be positioned radially between the body 410 and the support member 490. The expansion element 460 can extend circumferentially and continuously within an annular space. Alternatively or additionally, the expansion element 460 can extend partially within the annular space. The expansion element 460 can also extend longitudinally along a length of the stylus 400 (e.g., along a grip region).

The expansion element 460 can be configured to respond to a stimulus and change a shape of the body 410. For example, the expansion element 460 can be or include a bladder that contains or can contain a fluid. The fluid can include a gas (e.g., air) and/or a liquid (e.g., water). The adjustment element can be or include a pump 470 that directs the fluid from a fluid source into or out of the expansion element 460. For example, the pump 470 and/or the fluid source can be in fluid communication with the expansion element 460. As shown in FIG. 11, adjustment of the fluid amount in the expansion element 460 provides a stimulus (e.g., force) on the body 410 of the stylus 400. Where the support member 490 is substantially rigid, the expansion element 460 can expand until the body 410 changes its shape to accommodate the expansion element 460. For example, the first portion 420 can be forced radially outwardly to transition from a first shape (e.g., flat) to a second shape (e.g., curved).

Upon achieving a target shape of the body 410, as shown in FIG. 11, the pump 470 can persistently maintain the shape for a duration of time, for example, by actively controlling the fluid with the pump 470 or by operating a valve, such as a solenoid valve, to persistently maintain the fluid within the expansion element 460, rather than allowing the fluid to return to a fluid source. The first portion 420 can be biased to a preferred shape, such that the first portion 420 returns to the preferred shape when the expansion element 460 ceases to apply a force. The first portion 420 can be more flexible and compliant than the second portion 430, such that the first portion 420 is more responsive to forces applied to the first portion 420 and the second portion 430. The body 410 can include any number of portions that respond differently to the forces applied by the expansion element 460.

Figure 12:
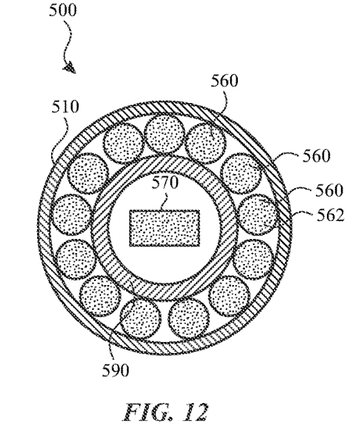
FIG. 12 illustrates a cross-sectional view of an exemplary stylus in a first state.
Figure 13:
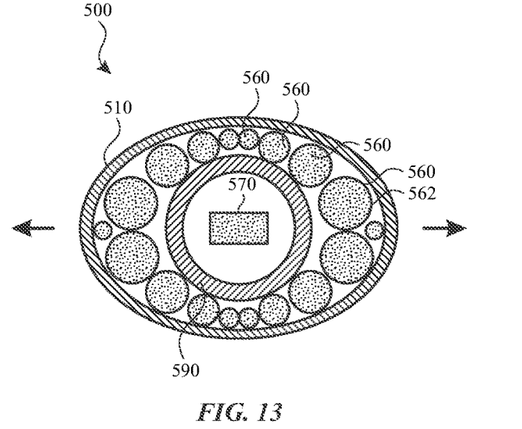
FIG. 13 illustrates a cross-sectional view of the exemplary stylus of FIG. 12 in a second state.

A shape of a body can also be adjusted by targeted stimuli. As shown in FIGS. 12 and 13, a stylus 500 includes a body 510 that defines an outer periphery of the stylus 500. The body 510 can extend longitudinally and circumferentially, as shown in the cross-sectional view of FIGS. 10 and 11. Within the body 510, the stylus 500 can include a support member 590. Expansion elements 560, such as bladders, can be positioned radially between the body 510 and the support member 590.

The expansion elements 560 can be configured to respond to a stimulus and change a shape of the body 510. For example, the expansion elements 560 can be or include bladders that contain or can contain a fluid. The fluid can include a gas (e.g., air) and/or a liquid (e.g., water). The adjustment element can be or include a pump 570 that directs the fluid from a fluid source into or out of the expansion elements 560. For example, the pump 570 and/or the fluid source can be in fluid communication with the expansion elements 560. As shown in FIG. 13, adjustment of the fluid amount in the expansion elements 560 provides a stimulus (e.g., force) on the body 510 of the stylus 500. Where the support member 590 is substantially rigid, the expansion elements 560 can expand until the body 510 changes its shape to accommodate the expansion elements 560. For example, portions of the body 510 can be forced radially outwardly to transition from a first shape (e.g., circular) to a second shape (e.g., oval).

As shown in FIGS. 12 and 13, the expansion elements 560 can expand and/or contract to different sizes in a given state. The individual selection of sizes for the expansion elements 560 confers a targeted shape upon the body 510. The pump 570 can control individual expansion and/or contraction of the separate expansion elements 560. As shown in FIG. 12, each of the expansion elements 560 can have a substantially similar size, such that radial distances between the support member 590 and the body 510 are substantially similar in the annular space. This can urge the body 510 to have a shape that is substantially similar (e.g., congruent) to the shape of the support member 590. For example, as shown in FIG. 12, the substantially similar sizes of the expansion elements 560 allow the body 510 to have a circular shape, similar to the circular shape of the support member 590. As shown in FIG. 13, the expansion elements 560 can have different sizes, such that radial distances between the support member 590 and the body 510 are substantially different in the annular space. This can urge the body 510 to have a shape that is different than the shape of the support member 590. For example, as shown in FIG. 13, the different sizes of the expansion elements 560 urge the body 510 to have an oval shape, while the support member 590 has a circular shape. Other shapes are contemplated, as discussed further herein.

Expansion and/or contraction of the expansion elements 560 can be guided and an arrangement of the expansion elements 560 can be maintained throughout numerous cycles of expansion and contraction. For example, all or at least some of the expansion elements 560 can be attached to the support member 590 and/or the body 510. By further example, all or at least some of the expansion elements 560 can be attached to each other (e.g., with each expansion element 560 coupled to a circumferentially adjacent expansion element 560).

Upon achieving a target shape of the body 510, as shown in FIG. 13, the pump 570 can persistently maintain the shape for a duration of time, for example, by actively controlling the fluid with the pump 570 or by operating a valve, such as a solenoid valve, to persistently maintain the fluid within the expansion elements 560, rather than allowing the fluid to return to a fluid source. The body 510 can be biased to a preferred shape, such that the body 510 returns to the preferred shape when the expansion elements 560 cease to apply a force. The portions of the body 510 can be more flexible than others, such that some portions are more responsive to forces applied by the expansion elements 560. The body 510 can include any number of portions that respond differently to the forces applied by the expansion elements 560.

Figure 14:
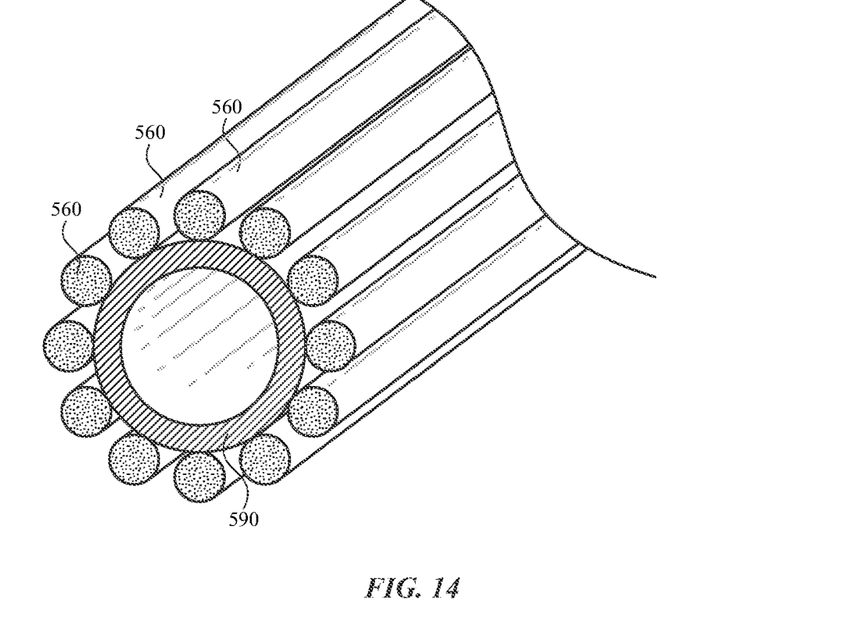
FIG. 14 illustrates a perspective view of a portion of an exemplary stylus.
Figure 15:
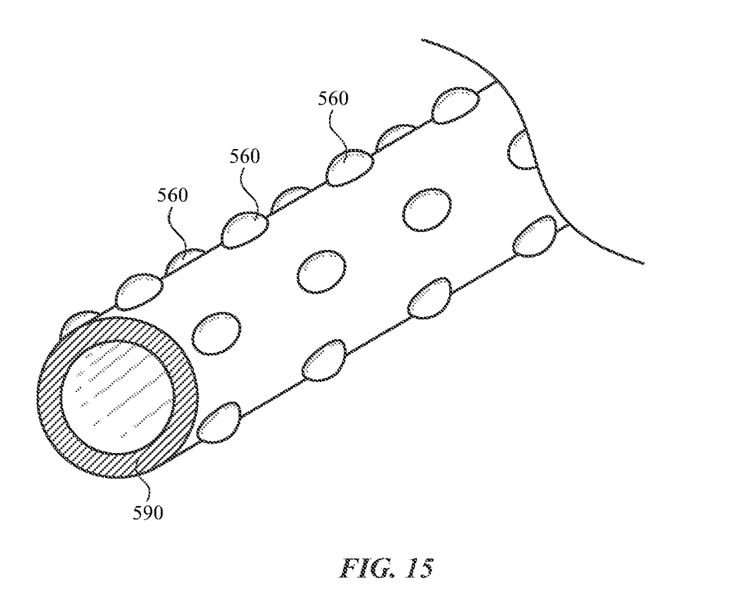
FIG. 15 illustrates a perspective view of a portion of an exemplary stylus.

As shown in FIGS. 14-15, each of the expansion elements 560 can be distributed circumferentially within an annular space. As shown in FIG. 14, the expansion elements 560 can also extend longitudinally along a length of the stylus (e.g., along a grip region). This allows a substantially similar cross-sectional shape to be formed at various longitudinal locations along the stylus. As shown in FIG. 15, the expansion elements 560 can be distributed longitudinally along a length of the stylus (e.g., along a grip region). This allows different cross-sectional shapes to be formed at various longitudinal locations along the stylus.

Various shapes are contemplated for the body 410 of FIGS. 10 and 11 and the body 510 of FIGS. 12 and 13. For example, the body 410 or the body 510, before or after a stimulus is applied, can have a cross-sectional shape that is circular, oval, polygonal, or a combination thereof. By further example, the body 410 or the body 510, before or after a stimulus is applied, can have a cross-sectional shape that is any of the shapes described herein with respect to the body 300 of FIGS. 6-9.

The body 410 or the body 510 can have an adjustable shape at a grip region of a stylus. For example, the body 410 or the body 510 can be included in the stylus 100 to provide an adjustable shape at the grip region 104. The shape can be selected manually by a user or automatically based on programmed parameters. The shape of the grip region 104 of the stylus 100 can be altered to mimic characteristics of a particular writing or drawing tool (e.g., pen, pencil, chalk, marker, or paintbrush). The shape of the grip region 104 of the stylus 100 can be altered to accommodate a user's hand. For example, a shape can be applied that conforms to a grip of a user. Alternatively or additionally, the body 200 can have an adjustable shape at region other than the grip region of the stylus.

The shape of the body 410 or the body 510 can be altered to limit rolling of the stylus on a surface by providing a non-circular shape. The shape of the body 410 or the body 510 can be altered to accommodate coupling of the stylus to another device, such as a charger by providing a surface that conforms to a surface to which the stylus will be coupled (e.g., magnetically coupled).

While the body 410 and the body 510 is shown in FIGS. 10-13 as being adjustable by action of a pump, the body 410 or the body 510 can be adjustable based on another adjustment element and/or stimulus. According to some embodiments, the shape of the body 410 or the body 510 can be manually adjustable by providing a user with access to the body 410, the body 510, or components connected thereto. For example, the user can apply a force directly to the body 410 or the body 510.

According to some embodiments, the fluid can be directed into and out of the expansion element 460 or the expansion elements 560 by applying, with an adjustment element, a magnetic stimulus. For example, the fluid can be a ferrofluid or magnetorheological fluid that is responsive to magnetic fields. The adjustment element can be or include a permanent magnet and/or an electromagnet to apply the magnetic field.

According to some embodiments, the shape of the body 410 or the body 510 can be adjusted by applying, with an adjustment element, a thermal stimulus to the body 410 or the body 510. For example, the body 410 or the body 510 can include a shape-memory material that is responsive to temperature conditions. The body 410 or the body 510 can have a first shape in a martensite phase of the shape-memory material and a second shape in an austenite phase of the shape-memory material. The adjustment element can be or include a heater to apply heat to the body 410 or the body 510 and/or a cooler to remove heat from the body 410 or the body 510.

According to some embodiments, the shape of the body 410 or the body 510 can be adjusted by applying, with an adjustment element, an electrical stimulus to the body 410 or the body 510. For example, the body 410 or the body 510 can include a charge induced material (e.g., electroactive polymer) that is responsive to electric fields. The body 410 or the body 510 can have a first shape in the presence of an electric field and a second shape in the absence of the electric field or in the presence of a different electric field. The adjustment element can be or include a voltage source connected to the body 410 or the body 510.

The size and/or shape adjustments described herein can be applied to any portion of a stylus. Adjustment of size and/or shape can be achieved in a body, a grip region, outside a grip region, a tip probe, and/or a rear portion of a stylus.

Figure 16:
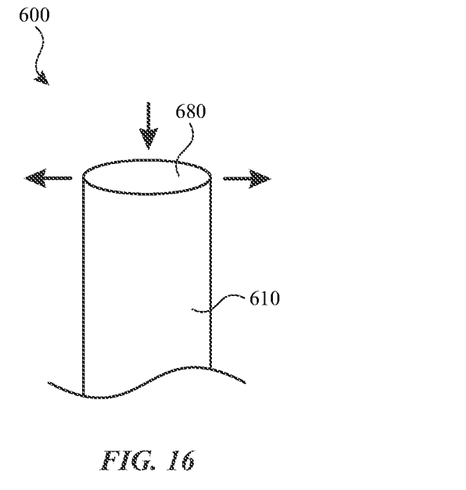
FIG. 16 illustrates a perspective view of a portion of an exemplary stylus in a first state.
Figure 17:
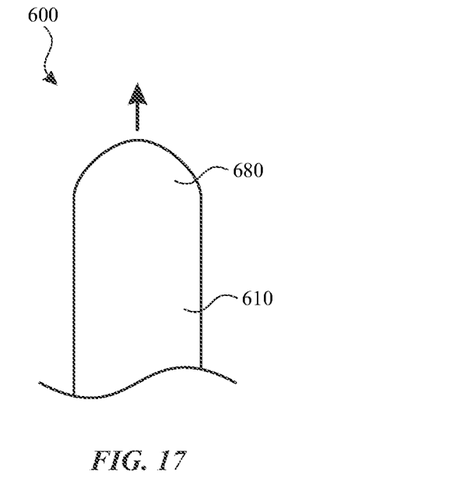
FIG. 17 illustrates a perspective view of the portion of the stylus of FIG. 16 in a second state.

A rear portion 680 of a stylus 600 can have an adjustable size and/or shape. As shown in FIG. 16, a rear portion 680 adjacent to a body 610 can be substantially cylindrical. As shown in FIG. 17, the rear portion 680 can be rounded (e.g., hemispherical). The size and/or shape of the rear portion 680 can be adjusted between various states (e.g., as shown in FIGS. 16 and 17) by altering radial and/or axial components of the rear portion 680. The size and/or shape of the rear portion 680 of the stylus 600 can be altered to mimic characteristics of a portion of a particular writing or drawing tool (e.g., an eraser). Adjustments to the size and/or shape of the rear portion 680 can be based on an adjustment element and/or a stimulus as described herein with regard to a body of a stylus. In some embodiments, the rear portion 680 can be an extension or component of the body 610 having the adjustable size and/or shape characteristics described herein.

Figure 18:
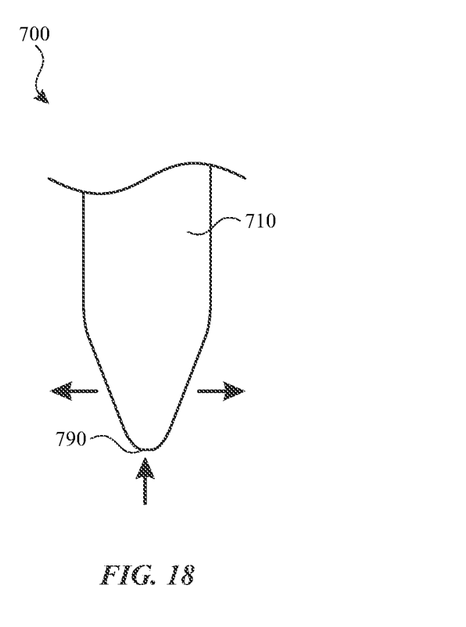
FIG. 18 illustrates a perspective view of a portion of an exemplary stylus in a first state.
Figure 19:
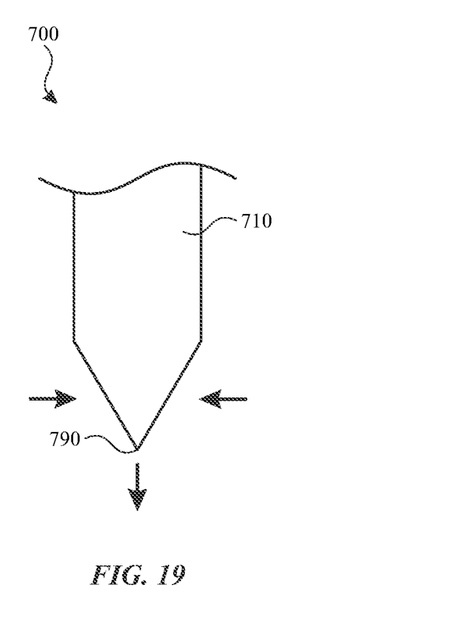
FIG. 19 illustrates a perspective view of the portion of the stylus of FIG. 18 in a second state.

A tip probe 790 of a stylus 700 can have an adjustable size and/or shape. As shown in FIG. 18, a tip probe 790 adjacent to a body 710 can be round or blunt. As shown in FIG. 19, the tip probe 790 can be pointed or sharp. The size and/or shape of the tip probe 790 can be adjusted between various states (e.g., as shown in FIGS. 18 and 19) by altering radial and/or axial components of the tip probe 790. The size and/or shape of the tip probe 790 of the stylus 700 can be altered to mimic characteristics of a portion of a particular writing or drawing tool (e.g., tip or blade of a pen, pencil, chalk, marker, or paintbrush). Adjustments to the size and/or shape of the tip probe 790 can be based on an adjustment element and/or a stimulus as described herein with regard to a body of a stylus. In some embodiments, the tip probe 790 can be an extension or component of the body 710 having the adjustable size and/or shape characteristics described herein.

Some electronic devices that include a display surface and/or a touch panel receive tactile input from a user and also provide haptic feedback to a user. Such vibrations can be utilized to convey a variety of different information to a user, such as information regarding one or more touch inputs that a user has provided, alerts, or status of the electronic device or one or more applications executing thereupon. The haptic feedback can be provided as changes in size (e.g., change of an amount of overlap between portions) and/or shape (e.g., change of a cross-sectional shape).

While some embodiments of handheld input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a handheld input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic stylus comprising:
a body defining an outer periphery of at least a portion of the electronic stylus and having a first portion and a second portion having an amount of an overlap along a region that extends longitudinally along a longitudinal length of the electronic stylus;
an adjustment element configured to apply a stimulus to the body; and
a controller operatively connected to the adjustment element, the controller being configured to command the adjustment element to change a diameter of the outer periphery defined by the first portion and the second portion by changing the amount of the overlap between the first portion and the second portion with the stimulus.

2. The electronic stylus of claim 1, wherein the adjustment element comprises a motor having a stator connected to the first portion and a rotor connected to the second portion, and the stimulus is a torque to move the second portion circumferentially across the first portion.

3. The electronic stylus of claim 1, wherein a region of the overlap extends longitudinally along a grip region of the electronic stylus.

4. The electronic stylus of claim 1, further comprising a bearing element between the first portion and the second portion.

5. The electronic stylus of claim 1, wherein the adjustment element is configured to repeatedly apply the stimulus such that the body changes the diameter to provide haptic feedback to a user.

6. An electronic stylus comprising:
a body defining an outer periphery of at least a portion of the electronic stylus;
an adjustment element configured to apply a stimulus to the body, the body defining a longitudinal length that extends across at least half of a total length of electronic stylus; and
a controller operatively connected to the adjustment element and configured to operate the adjustment element until, by the stimulus, the outer periphery changes from a first cross-sectional shape, extending uniformly across the longitudinal length of the body, to a second cross-sectional shape, different from the first cross-sectional shape and extending uniformly across the longitudinal length of the body.

7. The electronic stylus of claim 6, further comprising:
a support member within the body; and
an expansion element radially between the support member and the body;
wherein the adjustment element is configured to apply the stimulus by expanding the expansion element against the body.

8. The electronic stylus of claim 7, wherein the adjustment element comprises a pump configured to expand the expansion element by increasing an amount of a fluid within the expansion element such that the expansion element deforms the portion of the body.

9. The electronic stylus of claim 7, wherein the adjustment element comprises an electromagnet configured to expand the expansion element by applying a magnetic field to a ferrofluid or magnetorheological fluid and increasing an amount of the ferrofluid or magnetorheological fluid within the expansion element.

10. The electronic stylus of claim 6, wherein the first cross-sectional shape includes a first curvature and the second cross-sectional shape includes a second curvature, different than the first curvature.

11. The electronic stylus of claim 6, wherein the body extends across at least half of a total length of electronic stylus.

12. The electronic stylus of claim 6, further comprising:
multiple expansion elements within the body, wherein the adjustment element is configured to apply the stimulus by expanding each of the expansion elements to a different size and against the body.

13. The electronic stylus of claim 12, wherein the adjustment element comprises a pump configured to expand each of the expansion elements such that the expansion elements deform the body.

14. The electronic stylus of claim 12, wherein each of the multiple expansion elements is cylindrical and extends longitudinally against the body.

15. The electronic stylus of claim 12, wherein the multiple expansion elements are distributed longitudinally and circumferentially within the body.

16. The electronic stylus of claim 6, wherein the body comprises a shape-memory material, and the adjustment element is configured to apply heat to the body.

17. The electronic stylus of claim 6, wherein the body comprises an electroactive material, and the adjustment element is configured to apply an electric field to the body.

18. The electronic stylus of claim 6, wherein the adjustment element is configured to repeatedly apply the stimulus such that the body changes between the first and second cross-sectional shapes to provide haptic feedback to a user.

19. An electronic stylus comprising:
an end portion defining a longitudinal end of the electronic stylus;
a sensor configured to detect contact between the end portion and a surface;
an adjustment element configured to apply a stimulus; and
a controller operatively connected to the adjustment element and configured to command the adjustment element to change, by the stimulus, the longitudinal end from a first cross-sectional shape, having a first curvature, to a second cross-sectional shape, having a second curvature different from the first curvature.

20. The electronic stylus of claim 19, further comprising:
multiple expansion elements, wherein the adjustment element is configured to apply the stimulus by expanding each of the expansion elements to a different size and against the end portion.

* * * * *